March 11, 1952  J. H. KEMP, JR  2,588,732
APPARATUS FOR HANDLING LOADS
Filed July 26, 1948  2 SHEETS—SHEET 1

INVENTOR.
John H. Kemp Jr.
BY
ATTORNEY

March 11, 1952  J. H. KEMP, JR  2,588,732
APPARATUS FOR HANDLING LOADS
Filed July 26, 1948  2 SHEETS—SHEET 2
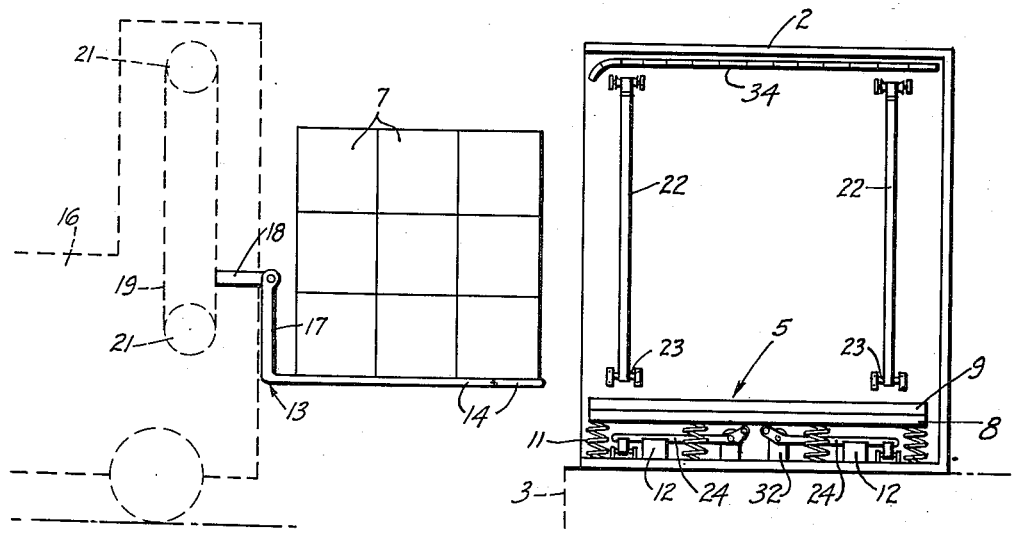
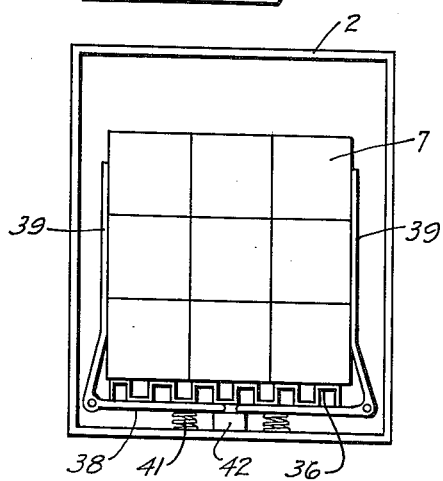
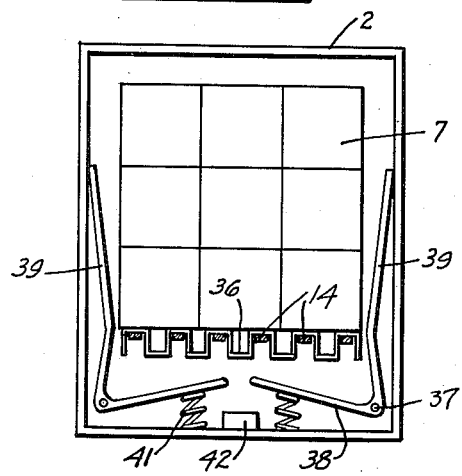
INVENTOR.
John H. Kemp Jr.
BY Harold E. Ing
ATTORNEY Patented Mar. 11, 1952

2,588,732

UNITED STATES PATENT OFFICE 2,588,732

APPARATUS FOR HANDLING LOADS

John H. Kemp, Jr., San Carlos, Calif.

Application July 26, 1948, Serial No. 40,752

1 Claim. (Cl. 214—65)

My invention relates to the handling and transportation of loads of parcel goods such as loads of boxes, cartons, bags or the like, and more particularly to a transportation system adapted for use with pallets and associated lifting forks such as disclosed in my copending application Serial No. 715,175, filed December 10, 1946, now Patent No. 2,451,226, granted October 12, 1948.

The use of small portable platforms called pallets have come into extensive use as an aid in the handling of goods. These pallets are usually about 3' x 5' in size, upon which a load of a ton or more of parcels such as cartons of canned goods or the like are stacked. The loaded pallets are lifted and hauled about a local area, say on a dock or within a warehouse, by an operator on a small power operated vehicle or truck having an elevator fork with tines adapted to engage under the pallet. With the improved fork and pallet structure disclosed in my above mentioned application, wherein the pallet has spaced ribs for supporting the load, the utility of the pallet system is enhanced because a load may be removed from the pallet by the same fork which is used to lift the loaded pallet.

The board object of my present invention is to provide a protective container having a pallet-like base structure adapted to coact with a lifting fork for loading and unloading the container.

Another object of my invention is to provide containers of the character described arranged in rows on the bed of a main carrier, such as a highway truck or railway flat car, the containers having side openings along the edges of the carrier bed so that the containers may be loaded and unloaded by a small fork truck operating alongside the highway truck or flat car.

Another object is to provide rows of such containers which fit together on the carrier bed to form a cellular body structure giving the same protection to goods in transit which was heretofore achieved by a covered van or boxcar, but which overcomes the loading and unloading problems inherent in conventional vans and boxcars.

Still another object is to provide containers of the character described which take standard pallet size loads and are so designed that a lifting fork at the shipping end of the operation may transfer loads directly from pallets to the containers, and at the receiving end of the operation may transfer loads directly from the containers to other pallets.

A further object is to provide means in the container for binding the load.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claim.

Referring to the drawings:

Figure 4 is an elevational view of a container and associated lifting fork, one of the walls of the container being removed to illustrate the internal parts.

Figure 5 is a front view of a modified container in which the lower deck is formed by a removable pallet; and Figure 6 is a similar view showing the removable pallet in elevated position.

In terms of broad inclusion, my apparatus for handling loads comprises a series of rectangular containers arranged in a row on the bed of a carrier, such as a main transportation truck, each container having a side opening along an edge of the bed and each having a lower deck with spaced ribs extending endwise toward the container opening for supporting a load. A lifting fork is provided having load carrying tines insertable through the side opening of any one of the containers, which tines are spaced and proportioned for engagement with the spaces between the ribs of the container deck. The containers are preferably of separate construction, sized to take a standard pallet load, and are preferably of substantially equal dimension so as to fit together to form a uniform cellular body on the carrier bed. Means are also preferably provided in each container for binding the load.

Figure 1:
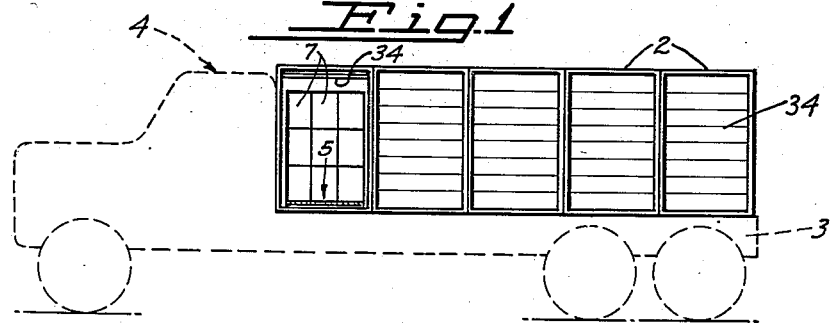
Figure 1 is a side elevational view illustrating apparatus embodying my invention and showing a series of containers on the bed of a main carrier.

In greater detail, and referring first to Figure 1 of the drawing, the improved apparatus for handling loads comprises a series of rectangular containers 2 arranged in a row on the bed 3 of a main carrier 4 indicated in diagrammatic outline by dotted lines, which may be a large transportation truck such as used on highways or which may be a railway flatcar. Each container has a side opening facing out along an edge of the bed 3, and in the normal arrangement there would be two rows of the containers 2, positioned back-to-back on the carrier bed and facing out along both sides of the carrier. The containers may be made of any suitable material such as sheet metal or plywood, and are preferably separately constructed boxes for ease of handling and to allow additional units to be added in a row depending upon the length of the carrier bed 3. Suitable means, such as metal straps, may be used to secure the containers together after assembly on the carrier. The individual containers are of substantially equal size to fit together to form a cellular-like body structure on the main carrier to protect the goods during transit, and each container is dimensioned to take a standard pallet-size load. Containers about 5' wide and about 7' high are preferred.

Figure 3:
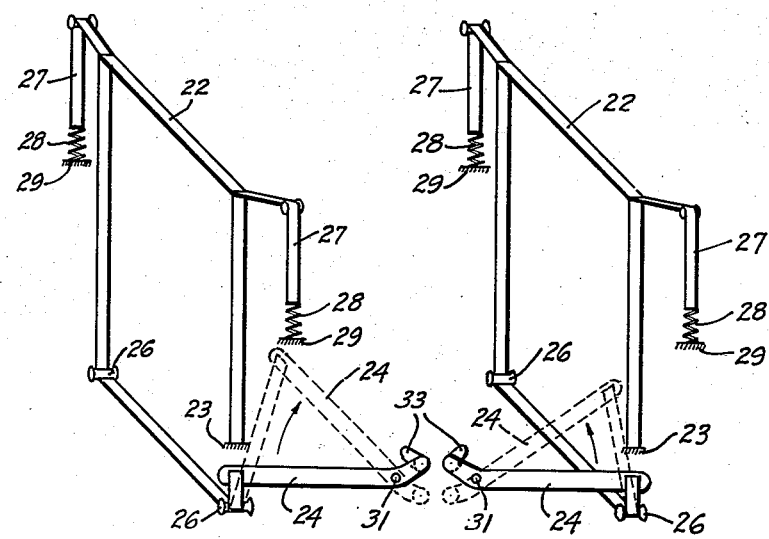
Figure 3 is a fragmentary perspective view showing the load binding means apart from the container.
Figure 2:
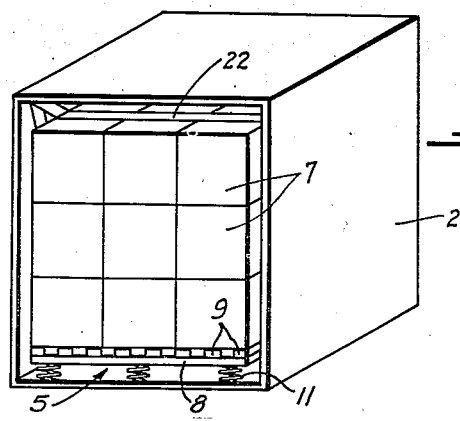
Figure 2 is a perspective view of one of the containers.

Figures 2, 3 and 4 illustrate the details of the preferred type of container structure having a built-in deck 5 for supporting the load of parcels 7. In this construction the lower deck 5 comprises a base 8 having spaced ribs 9 extending endwise toward the front opening of the container for supporting the load 7. Ribs about 3 inches wide and spaced a like distance apart are satisfactory, which spacing insures adequate support for the individual parcels of the load. The spaces between ribs 9 thus form open-ended grooves or channels facing the open side of the container. Deck 5 is preferably resiliently mounted for limited vertical movement by a group of coil springs 11 fastened to base 8 and to the underlying floor of the container. Transverse pieces 12 provide stops limiting downward movement of the deck.

The load 7 is placed in the container by a lifting fork 13 having parallel tines 14 insertable through the front side opening of container 2. Figure 4 shows the load supported on the fork tines prior to insertion into the container. The tines 14 are preferably flat metal bars and are spaced and proportioned for engagement with the spaces between the deck ribs 9. Tines about 2½ inches wide and spaced to engage between the ribs are satisfactory. By such a fork structure the load carrying tines 14 may be inserted into the container so as to position load 7 above the deck 5, after which the tines may be lowered into the spaces between ribs 9 to deposit the load on the deck. Tines 14 may then be withdrawn endwise from between the ribs. In a similar manner a load may be removed from the container by first inserting tines 14 between ribs 9 and then lifting the load and backing the loaded fork from the container.

Fork 13 is preferably mounted on a small truck 16 shown in diagrammatic outline by dotted lines in Figure 4, which truck is preferably of the type which is self powered and steerable by an operator. The fork has upstanding arms 17 fastened to a crossbar 18 on the front of the truck. Suitable elevator means are also provided on the truck for raising and lowering the fork. A chain 19 driven by sprockets 21 is shown connected to crossbar 18, but any other type of elevator mechanism may be employed.

Considering Figure 4 in conjunction with Figure 1 it will be seen that an operator on the small truck 16 can maneuver the small truck alongside the main carrier 4 and either load or unload the several containers on the bed 3. At the shipping end of the operation this involves inserting a loaded fork into an empty container, lowering the fork to deposit the load on the deck 5, and then backing the fork out. At the receiving end of the operation it involves inserting the fork tines under the load in the container, lifting the load off the deck 5, and then backing up the truck 16 to withdraw the loaded fork from the container. At either end of the operation the loads may be taken from and deposited on portable pallets such as disclosed in my hereinbefore mentioned application, so that fork truck 16 serves a variety of purposes, whether it be for loading or unloading the main carrier or for shifting pallets about in a local area.

Means are also preferably provided for binding the load in the container 2. In the construction just described this is done by straps 22 which embrace the load, and the binding and unbinding is automatic. A pair of straps 22 are looped around the interior of container 2, one end of each of the straps being fixed to a side wall by a terminal fixture 23 and the other end being fastened to a lever 24 actuated by vertical movement of the deck 5. Guide rolls 26 at the lower corners of the loop and tensioning straps 27 at the upper corners normally keep the loop in an open position ready to receive a load. Tension on the corner straps 27 is maintained by springs 28 anchored to the container walls as indicated at 29.

Levers 24 lie alongside the deck 5 and are journaled at their pivot points by pins 31 in bearings 32 mounted on the bottom wall of the container. The short inner ends of these levers carry studs 33 underlying the deck 5 (see Figure 4) so that when the deck is depressed by a load the outer ends of the levers swing up as shown in Figure 3. This action pulls the straps 22 taut to bind the load as illustrated in Figure 2. When a load is lifted from deck 5 the levers 24 swing back down and the tension of springs 28 force the loops to their wide open positions, thus unbinding the load for removal from the container.

A suitable closure or door for the open side of the container is shown in Figures 1 and 4, comprising a flexible slat or roll type door 34 slidable from the closed position seen in Figure 1 to an open position as illustrated in Figure 4.

Figures 5 and 6 show a modified container in which the load supporting deck 36 is removable. In this construction the deck conveniently comprises a standard pallet, preferably a corrugated metal type of pallet such as disclosed in my hereinbefore mentioned application. The deck as well as the load 7 may thus be removed by engaging the tines 14 under the pallet as illustrated in Figure 6. A modified load binding means is also shown in Figures 5 and 6 comprising bell crank levers pivoted by the rods 37 and having stiff inturned arms 38 underlying the deck and flexible upturned arms 39 extending alongside the load. These levers are preferably made of metal sheets so that the arms 38 and 39 are wide pads extending the depth of the container. Springs 41 under the arms 38 hold the parts in the open position as shown in Figure 6, and a stop 42 limits downward movement of arms 38 as seen in Figure 5. In the latter position the arms 39 bear against the sides of parcels to bind the load.

I claim:

Apparatus for handling a load comprising a rectangular container having a side opening, a load carrying pallet insertable through said opening, depressible means in the container for supporting the pallet, and means operable upon downward movement of the supporting means for binding the load and pallet together within said container.

JOHN H. KEMP, Jr.

REFERENCES CITED

The following references are of record in the file of this patent:

UNITED STATES PATENTS

| Number | Name | Date |
| --- | --- | --- |
| 1,179,300 | Hales | Apr. 11, 1916 |
| 1,710,737 | Kiesel, Jr. | Apr. 30, 1929 |
| 1,807,268 | Woodruff | May 26, 1931 |
| 2,123,669 | Von Der Ohe | July 12, 1938 |
| 2,146,436 | Lima | Feb. 7, 1939 |
| 2,412,184 | Ulinski | Dec. 3, 1946 |